W. H. EVERS.

BUILDING CONSTRUCTION.

APPLICATION FILED NOV. 21, 1916.

Reissued Sept. 11, 1917. 14,352.

Inventor

William H. Evers

By McKent

Attorney

HARRIS PETERS, INC., LITHO., WASHINGTON, D. C.

UNITED STATES PATENT OFFICE.

WILLIAM H. EVERS, OF LAKEWOOD, OHIO, ASSIGNOR, BY MESNE ASSIGNMENTS, TO TRUSTEES OF THE R. C. PRODUCTS TRUST, OF CLEVELAND, OHIO.

BUILDING CONSTRUCTION.

14,352. Specification of Reissued Letters Patent. Reissued Sept. 11, 1917.

Original No. 1,170,743, dated February 8, 1916. Serial No. 30,719, filed May 27, 1915. Application for reissue filed November 21, 1916. Serial No. 132,699.

*To all whom it may concern:*

Be it known that I, WILLIAM H. EVERS, citizen of the United States, residing at Lakewood, in the county of Cuyahoga and State of Ohio, have invented certain new and useful Improvements in Building Construction, of which the following is a specification.

This invention relates to improvements in building construction, particularly as applied to floors, roofs, and partitions, and has for its primary object the provision of a metal plate having reinforcing ribs so arranged that the plate will have substantially uniform strength, as regards bending, about different axes and thus be adaptable for bending into different shapes to be used with the well-known rafters, joists, beams and studding.

In combination with wooden rafters, studding, girders or joists the plates are readily nailed to said wooden members and by using concrete or plaster as requirements may demand, build floor ceilings or walls.

A most economical construction for floors, walls, or partitions is a combination of wood, steel or concrete rafters, beams, girders, plates or joists with my improved metal plate which is fashioned strong enough to serve the purposes of forms, can position reinforcing materials and also is formed to furnish plaster and concrete bond.

Figure 1:
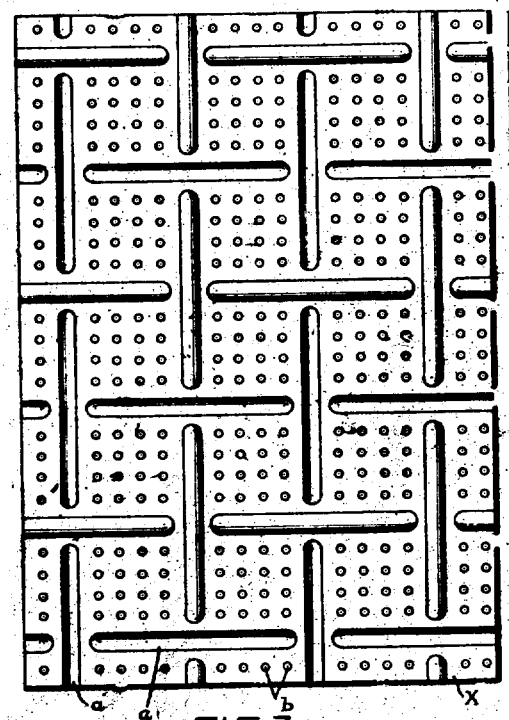
Figure 2:
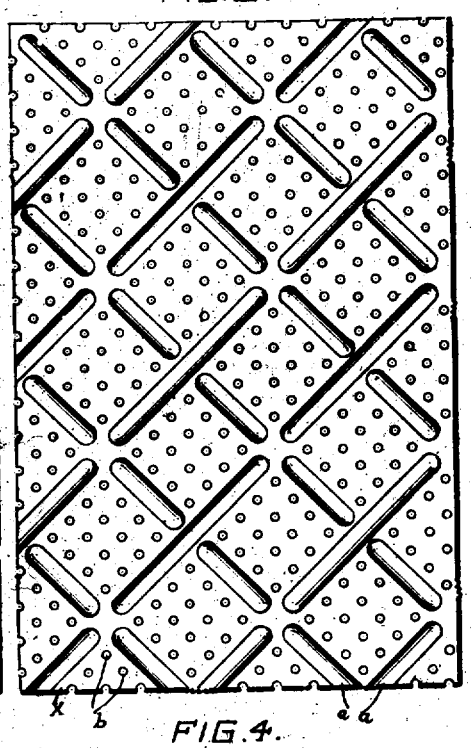
Figure 3:
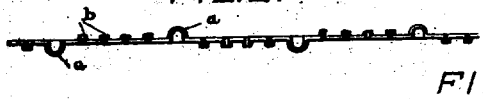
Figure 4:
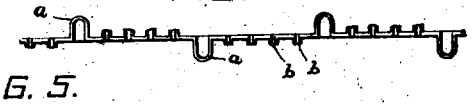
Figure 5:
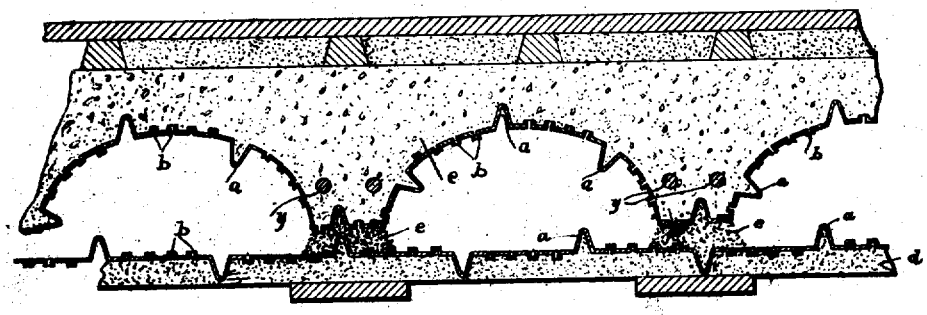
Figure 6:
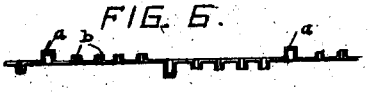
Figure 7:
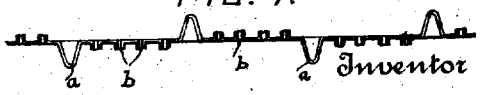

In the accompanying drawings, Figures 1 and 2 are plan views of two forms of metal plates embodying the invention. Figs. 3 and 4 are edge diagrams thereof respectively. Fig. 5 is a section showing the use of the plates in floor arches and ceilings. Figs. 6 and 7 are edge diagrams of modified plates.

In Figs. 1 and 2 $x$ are metal plates ribbed as at $a$ in more than one direction and on both sides of the plate; also reamed as at $b$ with holes regularly spaced between ribs, yet reamed alternately in opposite directions, so that the burs at the edges of the holes project on opposite sides.

The ribs of Fig. 2 are identical with those shown in Fig. 1 but vary in length and direction. Ribs wherever shown in Figs. 1—2—3—4—5—6—7— and the reamed holes in the same figures, are marked $a$ and $b$ respectively. Figs. 3—4—6 and 7 are edge diagrams of the ribbed reamed plates showing various locations and forms possible for the ribs, also possible position, size and rough finish, caused by reaming holes in opposite directions. Fig. 5 shows this metal plate serving as forms for the concrete $e$.

The methods of use and results secured can briefly be described as follows: In Fig. 5 the metal plate shown in Fig. 1 is spread across supporting frame work or blocks as shown at $e$. This metal plate serves as metal lath for plaster bond for the ceiling. The metal plate shown in Fig. 2 is used in arch form, Fig. 5. This plate by reason of ribs running diagonally and in opposite directions is peculiarly strong enough to hold any shape it may be formed to, and is also of sufficient strength to hold its form and carry construction loads usually carried by other forms during building operations. The metal plates are relatively placed as shown in Fig. 5, and after reinforcing material $y$ is positioned, concrete marked $e$ is poured into the forms and at points of contact of the metal plates enough of thin cementitious material will pass the reamed holes so that after proper setting these two metal plates will be bonded at $e$, so that after removing the supporting frame work, the metal plate $x$ shown in Fig. 1 is positioned ready to receive ceiling plaster $d$. This bonding of the two metal plates is considerably strengthened by the passing of plaster $d$ through the reamed holes at $e$. If a plaster finish $d$ is desired the plaster bond is perfected first by the reamed holes reamed away from the plaster side and secondly by its adhesion to the rough concrete surface caused by thin concrete passing the reamed holes that are reamed away from the concrete side.

The metal plates are ribbed in both and opposite directions to provide the same strength irrespective of which side of plate is used, and with holes reamed in opposite directions to provide a rough bonding surface for the adhesion of cementitious materials applied to either surface of the plate. The ribs can be designed so as to stiffen and strengthen metal to support the small loads usual to construction operations. They may also be designed in form and position to absolutely fix and plate reinforcing materials such as bars, rods and suspended wire or suspended wire rope. The plates can be bent to arch either convex or concave, also square, rectangular or any other form as the ceiling detail may be preferred, or the economy of construction may require, without loss of strength, the ribs running in opposite directions on both sides of the plate. The holes are reamed through the metal plates in such location and direction and of such diameter as will afford ample bond for concrete or for the plaster, or the applied cementitious material, yet of a form and size as will not pass an excess of these materials. These metal plates will give necessary strength to serve to outline and position all elements composing the floor or wall construction, rafters or joists, and will also provide perfect bond and adhesion for applied cementitious materials and can eliminate the use of collapsible forms.

What I claim as new is—

1. A sheet metal plate for building construction, having a plurality of intersecting rows of ribs projecting on opposite sides thereof and also provided with numerous perforations between the ribs, with rims around the perforations projecting on opposite sides of the plate at different perforations respectively.

2. A sheet metal plate for building construction, having a plurality of relatively short ribs projecting on opposite sides thereof and disposed in intersecting lines with the ends of each rib adjacent intermediate portions of other ribs and at an angle thereto, and perforations in the spaces between the ribs and projecting rims around the perforations, the rims around some of the perforations projecting on one side of the plate, and those around other perforations projecting on the opposite side of the plate.

3. A sheet metal plate of substantially uniform thickness having uniform reinforcing ribs extending in intersecting lines and symmetrical with respect to both sides of the plate, and perforations between said ribs.

4. A sheet metal plate having two similarly arranged series of uniform reinforcing ribs, symmetrical with respect to both sides of the plate and the ribs of each series being parallel and arranged at right angles to those of the other series, and perforations between the ribs.

5. A sheet metal plate having uniform ribs projecting on opposite sides thereof symmetrically, the ribs being in two series of intersecting lines, and perforations between the ribs.

6. A sheet metal plate of substantially uniform thickness and having on both sides relatively uniform reinforcing ribs extending in intersecting lines, both sides of the plate being relatively symmetrical and having substantially uniform bending characteristics with respect to axes parallel with any of the ribs or transverse thereto.

7. A sheet metal plate of substantially uniform thickness having on both sides non-intersecting reinforcing ribs extending in intersecting lines, both sides of the plate being relatively symmetrical and having substantially uniform bending characteristics with respect to axes parallel with any of the ribs or transverse thereto.

In testimony whereof I affix my signature

WILLIAM H. EVERS.

Copies of this patent may be obtained for five cents each, by addressing the "Commissioner of Patents, Washington, D. C."